June 26, 1928.
E. A. PRUDHOMME
1,674,796
PROCESS FOR REFINING AND STABILIZING HYDROCARBONS
Filed April 7, 1926
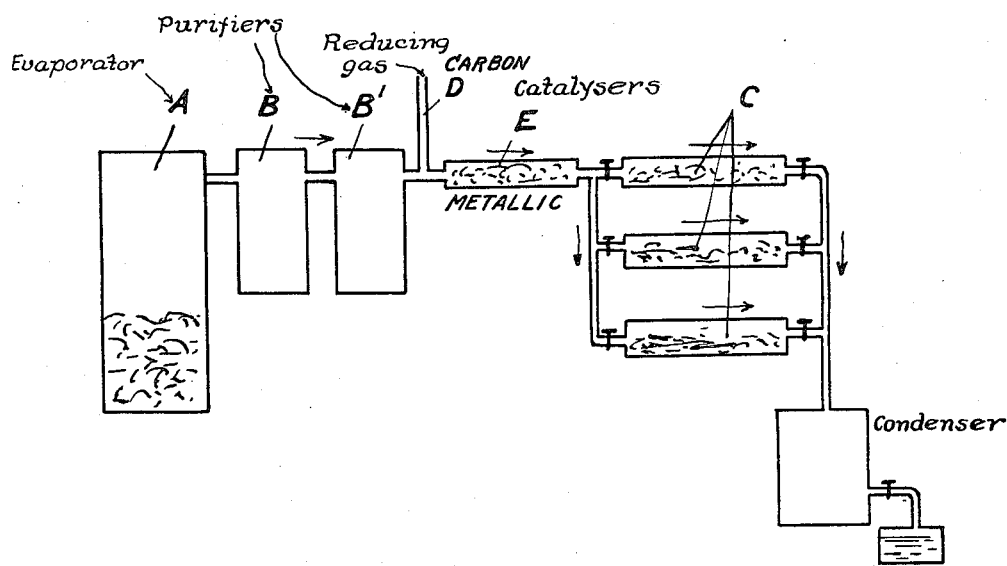

Patented June 26, 1928.

1,674,796

UNITED STATES PATENT OFFICE.

EUGENE ALBERT PRUDHOMME, OF NEUILLY-SUR-SEINE, FRANCE, ASSIGNOR TO SOCIETE INTERNATIONALE DES PROCEDES PRUDHOMME (S. I. P. P.), OF PARIS, FRANCE, A LIMITED JOINT-STOCK COMPANY OF FRANCE.

PROCESS FOR REFINING AND STABILIZING HYDROCARBONS.

Application filed April 7, 1926, Serial No. 100,463, and in France March 4, 1926.

It has already been proposed to refine natural or industrial hydrocarbons by a treatment by means of pulverulent substances and in particular by means of carbon rendered active, employed alone or in the presence of an oxidizing agent, or even in the presence of acids or alkaline bases. This treatment which is more generally effected in the cold, has for its principal object the elimination of the sulphur and colouring matters.

In other terms, the cycle of operations of saturation of an industrial or natural product being completed, it was proposed simply to eliminate from the product the detrimental substances, more particularly from the point of view of the smell and colour of the product and of its possible chemical action in its various applications. Briefly, the activated carbon was only employed under conditions in which its role of purifier-catalyzer effected no appreciable modification of the product, as much from the point of view of the saturation thereof as of its distillation curve.

By the process and the means for carrying out same which form the subject of the present application, the applicant proposes to treat industrial products derived by pyrogenation, distillation, cracking or otherwise, or even natural products, not only with a view to freeing them of detrimental agents, but in addition with a view to their modification as much from the point of view of their saturation as of their distillation curve.

In accordance with the present invention, the vaporized products, after having been submitted to an initial purification, are treated, at a suitable temperature, with an active catalyzer carbon, and,—which is essential—in the presence of reducing bodies, introduced preferably in the gaseous condition, the catalytic action of the active carbon preferably intervening only after passage of the vapours and gas over a first metallic, oxymetallic or other catalyzer. The combined action of a reducing agent (such as hydrogen, carbon monoxide, water gas, etc.) and of a catalyzer, has the effect, on the one hand of reducing the oxidized bodies such as the phenols, present in the product, and, on the other hand of completing the saturation of the product already previously treated with a view to its enrichment in hydrogen and its reduction of specific gravity.

Practically, the treatment of a product, such for example as the semi-products obtained by the processes which formed the subjects of applicant's previous patents, can operate as follows, and with a group of apparatuses such as are shown diagrammatically on the accompanying drawing.

A semi-product, collected by condensation and distilling for example between 200 and 400° C., is charged into an evaporation apparatus A, such as a boiler, where it is heated to a temperature of about 400° C. On issuing from the boiler, and until arrival over the activated carbon C, a temperature above 180° C. is maintained in the apparatuses if necessary by the addition of heat. The maintenance of this temperature, together with the effect of the velocity of the gases, which velocity may, if desirable, be increased by a suitable arrangement of pipes, etc., substantially prevents any loss of gases due to condensation during the passage of the same from the boiler to the carbon recipient C. The hydrocarbon vapours are first subjected to purification, they pass through two purifiers B, B¹, arranged in series, which act, the first—constituted for example of finely divided suboxide of nickel—for retaining pricipally the mineral sulphur which presents itself in the form of $H^2S$; the second, constituted for example of finely divided copper oxides, retaining more particularly the organic sulphur which presents itself in the form of thiophene, mercaptans, or other similar compounds.

Thus purified, the vapours to which are added, at D, the reducing gases (hydrogen, carbon monoxide, water gas, or other suitable gas) are conducted over a metallic or oxymetallic catalyzer E, having a nickel, vanadium, cobalt or other base.

On leaving the catalyzer, after having thus experienced a first enrichment and a reduction of specific gravity, the hot gases are led over active carbon upon which the enrichment in hydrogen and reduction of specific gravity is continued. The recipients containing the activate of carbon are preferably not heated.

As can be seen, the active carbon is far from having the usual essential role of purifier (decolouring and deodorizing); it serves to complete the hydrogenation in order to insure the stabilization and the refining of the product. Finally, after passage over the active carbon, the product, with its composition definite, is condensed and collected by the usual means.

Starting with a semi-product distilling between 200 and 400° C., a definite product distilling between 60 and 220° C. is thus obtained, this product being at the same time free from any agent detrimental in its various applications.

I claim:

1. A process for the treatment of hydrocarbon products which consists in vaporizing all of said products having a boiling point less than 400° C., and in treating the products of evaporation without substantial separation without heating with activated carbon in the presence of hydrogen, said products being maintained at a temperature of 180° C. until arrival at said carbon.

2. A process for the treatment of hydrocarbon products which consists in vaporizing all of said products having a boiling point less than 400° C., and then in treating the products of evaporation without separation with a metallic catalyzer and then activated carbon in the presence of a reducing agent and without heating.

3. A process for the treatment of hydrocarbon products which consists in vaporizing said products at a temperature less than 400° C., and in passing all of the products of evaporation at a temperature above 180° C. first through a purifying element containing a metallic oxide and then through catalyzing elements containing a metallic base and finally through activated carbon with the addition of a reducing gas without further heating.

4. A process for the treatment of hydrocarbon products which consists in vaporizing said products at a temperature less than 400° C., and in passing all of the products of evaporation without separation and at a temperature above 180° C. through a purifying element containing nickel and copper oxides, and then through catalyzing elements containing a nickel base and then activated carbon with the addition of a reducing gas without heating the carbon containing element.

5. A process for the treatment of hydrocarbon products which consists in vaporizing said products at a temperature less than 400° C., in subsequently maintaining the products of evaporation above 180° C., and in passing all of said products of evaporation without substantial separation first through a purifying element containing a nickel oxide, then through a purifying element containing copper oxide, then in adding a reducing gas, then in passing said products and reducing gas through a catalyzer having a nickel base and a catalyzer having a carbon base the latter not being heated, and finally in condensing the resulting products.

In testimony whereof I have signed this specification.

EUGENE ALBERT PRUDHOMME.